United States Patent [19]

Fulks

[11] Patent Number: 5,627,444
[45] Date of Patent: May 6, 1997

[54] SWITCHED RELUCTANCE MOTOR CONTROL

[75] Inventor: Gary C. Fulks, Spring Valley, Ohio

[73] Assignee: General Motors Corporation, Detroit, Mich.

[21] Appl. No.: 453,688

[22] Filed: May 30, 1995

[51] Int. Cl.$^6$ .................................................. H02P 1/46
[52] U.S. Cl. ................................... 318/701; 318/254
[58] Field of Search ..................... 318/254, 138, 318/701, 685, 715, 723, 696

[56] References Cited

U.S. PATENT DOCUMENTS

| | | | |
|---|---|---|---|
| 4,477,196 | 10/1984 | Ito | 368/157 |
| 4,480,218 | 10/1984 | Hair | 318/685 |
| 4,520,302 | 5/1985 | Hill et al. | 318/696 |
| 4,551,708 | 11/1985 | Welburn | 340/347 |
| 4,670,696 | 6/1987 | Byrne et al. | 318/701 |
| 4,684,866 | 8/1987 | Nehmer et al. | 318/696 |
| 4,707,650 | 11/1987 | Bose | 318/685 |
| 4,904,917 | 2/1990 | Hakluytt | 318/696 |
| 4,922,169 | 5/1990 | Freeman | 318/254 |
| 4,933,620 | 6/1990 | Macminn et al. | 318/701 |
| 4,975,608 | 12/1990 | Aspden | 310/114 |
| 5,010,267 | 4/1991 | Lipo et al. | 310/162 |
| 5,072,166 | 12/1991 | Ehsani | 318/685 |
| 5,196,775 | 3/1993 | Harris et al. | 318/638 |
| 5,223,771 | 6/1993 | Chari | 318/254 |
| 5,227,709 | 7/1993 | Gauthier et al. | 318/685 |
| 5,296,793 | 3/1994 | Lang | 318/715 |
| 5,321,342 | 6/1994 | Kruse | 318/254 |
| 5,378,975 | 1/1995 | Schweid et al. | 318/685 |

*Primary Examiner*—John W. Cabeca
*Attorney, Agent, or Firm*—Anthony Luke Simon

[57] ABSTRACT

Rotor position information for a switched reluctance motor rotor is obtained during energization of a stator winding of the motor with a fixed voltage pulsed signal. The inductance of the rotor is sensed and monitored to determine a minimum inductance of the stator winding. A microprocessor controller uses the minimum inductance to dynamically update a threshold value that the sensed inductance is compared to when determining whether to de-energize the stator winding that is energized and to energize the next stator winding. By dynamically updating the threshold value, the controller compensates for manufacturing tolerances in the stator windings and dynamic inductance changes of the stator windings due to aging and changes in the operating temperature thereof.

9 Claims, 8 Drawing Sheets

SWITCHED RELUCTANCE MOTOR CONTROL

BACKGROUND OF THE INVENTION

Switched reluctance motors typically comprise a soft magnetic rotor with a plurality of soft magnetic poles and a stator comprising a plurality of independently controllable coils for the selective generation of magnetic flux. Torque is created when current is applied to one of the coils and the coil responsively generates electromagnetic flux that operates on a soft magnetic pole of the rotor proximate to, but not aligned with, the energized coil. The flux acts on the rotor creating a force tending to align the soft magnetic pole on the rotor with the pole of the energized coil. The created force tending to align the pole on the rotor with that on the coil translates into rotational torque of the solenoid rotor. When the pole is aligned with the energized coil, there is no more aligning torque. Consequently, another coil of the motor must be energized to act on a pole of the rotor.

To achieve the phase-switching control of the synchronous reluctance motor, it is necessary to know the position of the rotor in relation to the stator coils. In one known method, position is sensed by a position sensor on the rotor that sends position feedback signals to a motor controller. An example known position sensor includes an encoder wheel that rotates with the rotor and one or more sensors (i.e., Hall effect sensors) mounted fixedly relative to the stator.

SUMMARY OF THE INVENTION

This invention provides a synchronous reluctance motor control in accordance with claim 1.

Advantageously, this invention provides a synchronous reluctance motor control that eliminates the need of a separate rotor position sensor in a synchronous reluctance motor.

Advantageously, this invention provides a synchronous reluctance motor control that eliminates the need of packaging of electronics and sensors in the motor itself, thus allowing implementations in which all of the motor's control electronics are remotely mounted.

Advantageously, this invention provides a synchronous reluctance motor control that monitors inductance of an energized stator winding in a synchronous reluctance motor and uses that measured inductance to determine when to de-energize, or switch OFF, the energized motor winding and to energize the next stator winding.

Advantageously, this invention recognizes that the inductance (or reluctance) of an energized coil in a synchronous reluctance motor varies with the position of the motor rotor. Measured inductance of the energized coil is used, according to this invention, as a signal indicative of rotor position and is used as an input to a position responsive control for the synchronous reluctance motor, eliminating the need for a separate position sensor to be mounted in the motor.

Advantageously, this invention implements pulse-width modulation to provide synchronous reluctance motor control.

Advantageously, a preferred synchronous reluctance motor control according to this invention comprises the steps of energizing a stator winding of a synchronous reluctance motor with a fixed voltage pulsed signal, sensing inductance through the energized winding, comparing the sensed inductance through the energized winding to a threshold wherein a sensed inductance value greater than the threshold indicates that the energized winding should be de-energized and that a next phase of the stator windings should be energized, periodically updating the threshold responsive to an operating condition of the motor, and outputting the determined threshold to a circuit performing the comparing step.

Advantageously, a preferred synchronous reluctance motor control apparatus according to this invention comprises: a sensor for sensing inductance through an energized coil of a stator; a filter receiving a signal from the sensor and providing a filtered signal responsive thereto; a comparator circuit receiving the filtered signal and a threshold signal and providing a comparison output responsive to a comparison between the filtered signal and the threshold signal; a microprocessor controller receiving an operating signal indicative of an operating condition of the motor and outputting the threshold responsive to the operating condition; and a trigger circuit, receiving the comparison signal and outputting a trigger signal responsive thereto, wherein the trigger signal triggers energization of a next phase coil of the stator.

Advantageously, another example preferred synchronous reluctance motor control according to this invention comprises the steps of first energizing one stator winding of a plurality of stator windings of a synchronous reluctance motor with a torque signal of a period less than a period between when the one stator winding is first energized and when a next phase stator winding is to be energized, second energizing the one stator winding with a measurement signal, wherein the measurement signal is a fixed voltage pulsed signal having a second duty cycle that is not equal to a first duty cycle of the torque signal, sensing inductance of the one stator winding during the second energization of the winding, comparing the sensed inductance to a threshold, wherein a sensed inductance value greater than the threshold indicates that the energized one stator winding should be de-energized and that the next phase stator windings should be energized.

Advantageously, yet another example preferred synchronous reluctance motor control according to this invention further comprises the steps of periodically updating the threshold responsive to an operating condition of the motor, and outputting the updated threshold to a circuit performing the comparing step.

BRIEF DESCRIPTION OF THE DRAWINGS

The present invention will now be described, by way of example, with reference to the accompanying drawings in which.

DETAILED DESCRIPTION OF THE INVENTION

Figure 1:
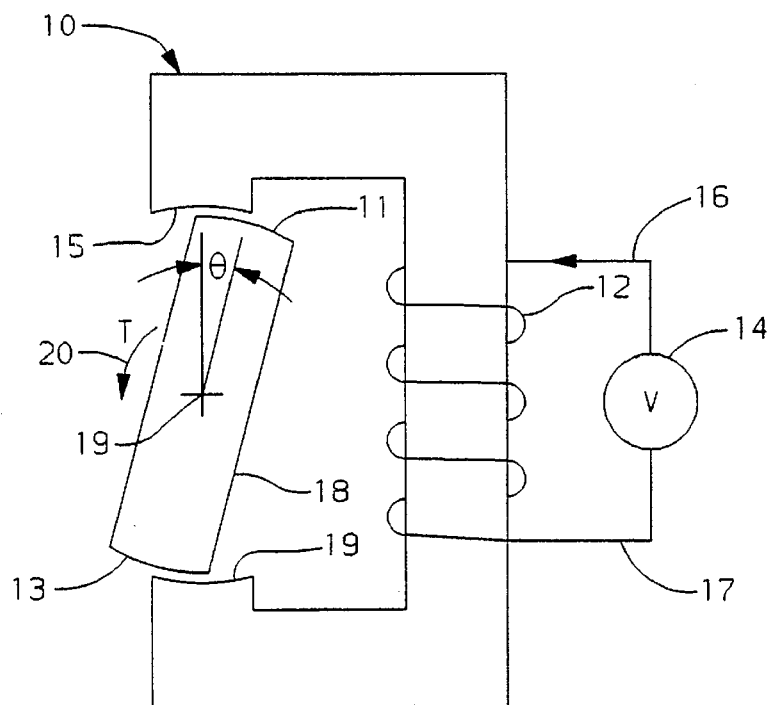
FIG. 1 illustrates a schematic diagram of a simple synchronous reluctance motor.
Figure 2A:
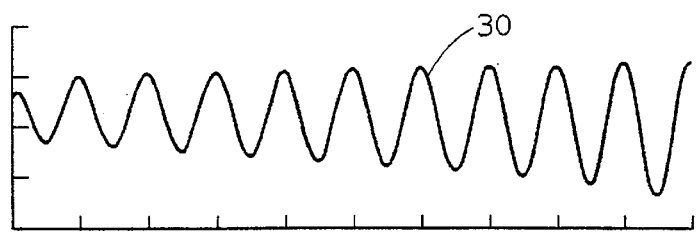
FIGS. 2A, 2B, 2C and 2D illustrate various synchronous reluctance motor control signals according to this invention.
Figure 2B:
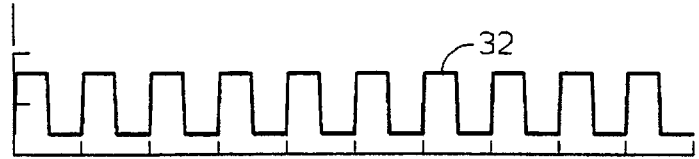

Referring to FIG. 1, the schematic shown illustrates a simple synchronous reluctance motor and the application of the principles of this invention. The simple synchronous reluctance motor shown includes a winding 12 around a core 10 receiving a pulsed voltage from voltage source 14 via lines 16 and 17. In this example, the voltage from voltage source 14 is pulsed at a fixed level as shown, for example, by trace 32 in FIG. 2B.

Energization of coil 12 causes magnetic flux to flow through the core 10, which is directed via the shape of the core 10 to the rotor 18, pivotably mounted about axis 19. The simple rotor shown has the two soft magnetic poles 11 and 13 in proximity to poles (15) and 19 of the core 10, respectively. As shown, a line intersecting the centers of the two soft poles, 11 and 13, of rotor 18 is at an angle θ to a line intersecting the centers of the two poles 15 and 19.

When coil 12 is energized, magnetic flux flows through core 10 and attempts to travel a path from pole 15 to pole 19. With a freely rotating rotor 18 pivotable about axis 19 in the position shown at an angle θ to the poles 15 and 19, the flux flowing between the poles 15 and 19 acts on the rotor 18, creating a rotational torque 20 on the rotor 18 that tends to rotate the rotor 18 in the direction 20. In the simple motor shown, once the rotor 18 is aligned with the two poles, the rotational torque 20 becomes zero and further energization of coil 20 will tend to maintain the rotor 18 aligned with the poles 15 and 19 of core 10. The principles of this invention are based on what happens as the rotor 18 is rotating to align itself with the poles 15 and 19.

Referring now also to FIGS. 2A–D, as the pulses in the signal 32 are applied to the coil 12 from pulse voltage source 14, a current, shown by trace 13, flows through the coil 12. It can be shown that in the simple synchronous reluctance motor shown, flux linkage between the core 10 and the rotor 18 is a function of rotor position. It can further be shown that inductance (L) of the coil 12 is a function of the flux linkage and that, for a fixed applied voltage level of the pulses energizing the coil, the magnitude of AC current through the energized coil 12 (Reference 30, FIG. 2A) is a function of inductance. This invention takes these relationships into account in a synchronous reluctance motor control and recognizes that the current through the coil 12 for a known voltage applied to the coil 12 has a magnitude that is a function of the flux linkage, which is a function of the position of the rotor.

FIGS. 2A–D illustrate this current versus position function according to this invention. The current trace 30 shows that the current (I) through coil 12 has a magnitude that increases as the angle θ between the rotor poles 11 and 13 and the core poles 15 and 19 decreases. This current increase, according to this invention, is used as a measure of rotor position and, when the rotor is positioned such that the current increases above a certain threshold, a signal is activated to switch OFF or de-energize the presently energized stator coil and begin energizing the coil of the next phase of the stator.

Figure 2C:
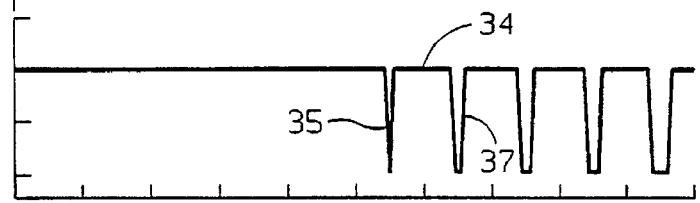
Figure 2D:
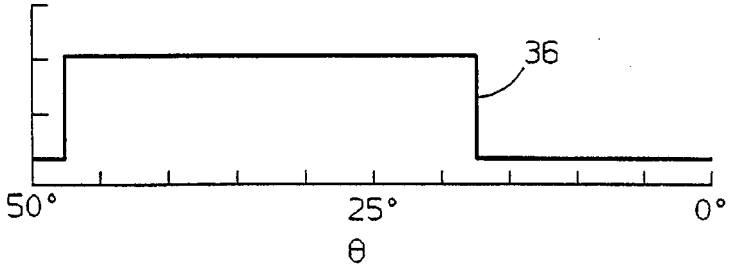

An example of a technique for implementing this invention to generate the controlled signal can be understood with reference to FIGS. 2C and 2D and the traces 34 and 36.

Trace 34 is the output of a threshold comparator, which may be a differential amplifier that provides a normally high output signal that goes low when the current signal 30 has the magnitude less than a predetermined threshold. Reference 35 is the first output pulse of the differential amplifier and reference 37 is the second output pulse. The pulses output from the comparator are used in combination with the pulses 32 energizing coil 12 (FIG. 1) to generate the gating command turning OFF the presently energized stator coil and energizing the next stator coil.

For example, when signal 34 is low while signal 32 is high, a trigger output (reference 36) goes low, signaling off the presently energized coil and signaling on the next energized coil. Note that the first low comparator pulse 35 of trace 34 did not change the trigger signal 36 because pulse 35 did not overlap with a high portion of signal 32. However, the second low pulse 37 of the comparator trace 34 does overlap with a high portion of the signal 32, thus triggering the signal 36 to go low. When signal 36 goes low, according to this invention, the presently energized coil is no longer energized and the next stator coil to be energized is energized.

The predetermined threshold that the current signal 30 is compared to, according to this invention, is a dynamic signal that depends on motor speed, the operating conditions of the motor and, in some cases, the desired motor torque output. The threshold is continuously updated by a microprocessor controller responsive to the duty cycle of the pulse width modulated (PWM) energization signals, the speed of the motor, and the operating condition of the motor (as measured by changes in minimum inductances of the stator coils). The duty cycle of the pulse width modulated signals may be determined, in one example, responsive to commanded torque. In another example, the duty cycle of the pulse width modulated signals is fixed to one or more predetermined values in a range that provides minimum error in the position detection function according to this invention.

In general, the continuously updated threshold, TRIGGER, is determined according to the equation:

$$TRIGGER = (L_{MAX} - L_{MIN})(k_1 * \omega) + L_{MIN},$$

where $L_{MAX}$ is the stator coil inductance at its maximum—when aligned with a rotor pole, $L_{MIN}$ is the stator coil inductance at its minimum—when no stator pole is present, $k_1$ is a motor constant and $\omega$ is the rotational velocity of the motor. The motor constant can be easily determined by one skilled in the art by applying a series of pulses 32, one at a time, to each coil of the stator and mechanically restricting the rotor position of the motor. The rotor position is advanced in known increments so that an output wave form of the current signal 30 is recorded as a function of measured rotor position using an external rotor position measuring device applied for purposes of calibration. The magnitude of the voltage at which the energized coil is to be gated OFF and the next coil is to be energized is the magnitude of the current trace 30 (which is a voltage signal) corresponding to the position at which the next energization is desired. The above process is repeated to gather current data corresponding to the application of different PWM signal duty cycles to the motor. The resulting data is then used with the above equation to solve for $k_1$ that best matches the computed TRIGGER with the ideal trigger level. The constant $k_1$ may be dependent upon the duty cycle of the PWM signal, in which case $k_1$ is determined for various duty cycles and is scheduled as a function of duty cycle.

Figure 3:
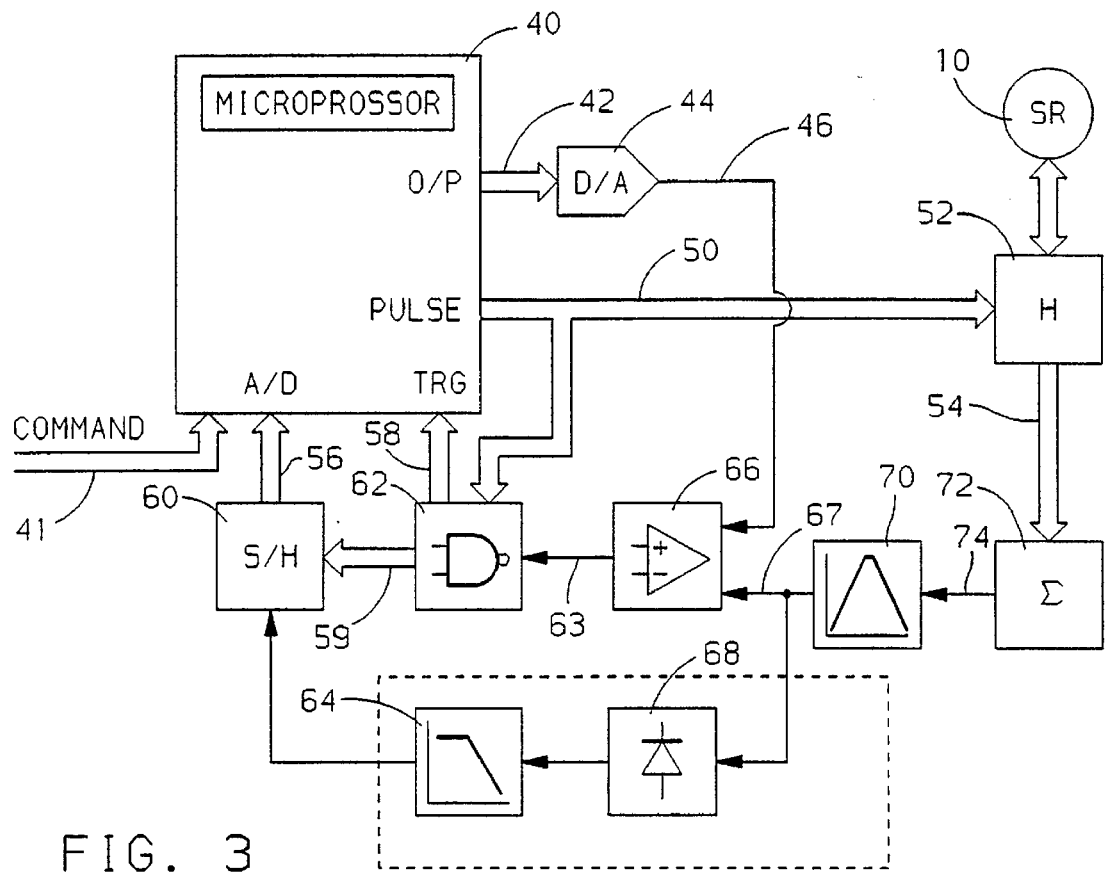
FIG. 3 illustrates a schematic of an example synchronous reluctance motor control according to this invention.

Referring now to FIG. 3, an example apparatus and method for implementing this invention is schematically shown. The synchronous reluctance motor control apparatus according to this invention shown includes a microprocessor controller 40 having an output bus 42 connected to a digital-to-analog converter 44 and output clock and logic bus 50 connected to the synchronous reluctance motor logic and bridge circuit 52. Microprocessor 40 includes a digital input labeled TRG (trigger) receiving trigger line 58 and an analog-to-digital (A/D) converter input receiving bus 56 from the sample and hold circuit 60.

The synchronous reluctance motor logic and bridge circuit 52 controls the synchronous reluctance motor represented generally by the reference 10 and has an output bus 54 connected to the summation block 72. The control circuit further includes trigger circuit 62, comparator circuit 66, band pass filter 70, rectifier 68 and low pass filter 64. The microprocessor 40 contains permanent and random access memory and may include an internal programmable read-only memory.

The microprocessor's permanent memory contains an operating program that includes control routines for providing motor control pulses on bus 50 and for setting the dynamic threshold on line 46 vis-à-vis output bus 42 and digital-to-analog converter 44. Microprocessor 40 determines the dynamic threshold, TRIGGER, in the manner described above responsive to control commands on bus 41, bus 56 and bus 58 to achieve desired closed loop control of the synchronous reluctance motor 10.

The control algorithm controls the microprocessor 40 to provide a series of pulses on a first line of bus 50 that control both the synchronous reluctance logic and bridge circuitry 52 and the trigger circuit 62. The pulses on bus 50 are provided at a fixed frequency of, for example, 20 KHz, at which it is desirable to energize the phase coils of the synchronous reluctance motor 10. In response to the pulses received on bus 50, logic and bridge circuit 52 switches on and off the gating transistors controlling the energization of the phase windings of the synchronous reluctance motor at a duty cycle and frequency equal to a duty cycle commanded on bus 50 at a frequency of the pulses on the first line of bus 50.

Bus 50 provides control signals to the logic portion of the circuitry 52 that controls the selection of the stator coil to be energized and the direction of rotation of the motor.

Bus 54 carries signals indicative of the current through each phase of the stator windings. Block 72 sums the current signals on bus 54 and provides a single signal on line 74 that is representative of the sum of the currents through the stator phase windings. Since the stator phase windings are energized one at a time and since the stator windings are controlled by a bridge circuit, the current signals through the un-energized stator windings are minimal and may be assumed for purposes of this invention to be zero. It follows then that the signal on line 74 is also indicative of the measure of current through the energized stator coil. The current signal on line 74 is band pass filtered at block 70 with the band pass filter frequency centering around the frequency of the PWM signals (trace 32, FIG. 2B). For example, the band pass filter 70 is a second order filter with the band pass centered around the 20 KHz frequency and having a pass band width of 10 KHz. The output of the band pass filter 70 on line 67 appears as a sinusoidal signal having a magnitude indicative of the magnitude of current through the energized phase coil. An example band pass filter output is the trace 30 shown in FIG. 2A.

The band pass filter signal on line 67 is provided to comparator 66 and rectifier 68. Comparator 66 receives the signal on line 67 at its inverting input and receives the signal on line 46 at its non-inverting input. As described above, the signal on line 46 is the threshold signal to which the magnitude of the filtered current signal on line 67 must pass before the output of the comparator 66 on line 63 goes high. Also as explained above, the threshold on line 46 is dynamically determined in the microprocessor 40 in response to the motor operating conditions. Microprocessor 40 determines the signal for line 46 as the current magnitude level that indicates that the rotor pole is in a position relative to the energized stator winding pole at which it is desirable to de-energize the energized stator winding and energize the next stator winding to be energized.

When the magnitude of the current signal on line 30 rises above the threshold on line 46, comparator 66 provides an output pulse on line 63 to the trigger circuit 62. The signal on line 63 corresponds to the trace 34 in FIG. 2C. Also provided to the trigger circuit 62 is the pulse signal 32 on bus 50 or a pulse signal indicating the pulsing of the motor stator coils. The trigger 62 operates as a NAND gate and goes low when a pulse on line 63 overlaps with a pulse from bus 50. Referring to FIG. 2C, this occurs with pulse 37, illustrating a phase relationship between the gate pulses on trace 32 and the comparator pulses on line 63. As a result of the pulse 37, the output of the trigger circuit 62 goes low as shown by trace 36 in FIG. 2D. The high-to-low event at the output of trigger 62 acts as a trigger on line 58 provided to the microprocessor 40 and on line 59 provided to the sample and hold circuit 60.

Microprocessor 40 receives the trigger from line 58 and sends the logic command through bus 50 to de-energize the currently energized stator coil and energize the next energized stator coil. In this manner, closed loop running control of the synchronous reluctance motor is achieved without requiring encoded position sensor in the synchronous reluctance motor and using only the simple circuit elements shown. Alternatively, trigger circuit 62 is coupled directly to logic and bridge circuit 52 to automatically trigger de-energization of the currently energized stator coil and energization of the next-energized stator coil.

While the circuit elements 62, 66, 70 and 72 provide, together with microprocessor 40, closed loop running control of the motor, additional circuitry is desired to provide start-up control and self-calibration. Start-up control requires determining the position of the rotor so that it is known which stator coil to first energize to begin rotation in the proper direction. Self-calibration requires measuring the inductance of the stator phase windings to compensate for inductance variations due to manufacturing tolerances and to compensate for dynamic inductance changes due to the operating temperature and aging of the stator coils. Example additional circuitry for use in start-up and self-calibration includes rectifier 68 and low pass filter 64.

SELF CALIBRATION

During motor running conditions, the signal on line 67 is as described above and is provided to the rectifier 68 and low pass filter 64, which, for example, is a second order 2 KHz low pass filter. The results of the rectifier 68 and low pass filter 64 provide a DC signal, indicative of the magnitude of the signal on line 67, to the sample and hold circuit 60. The sample and hold circuit 60 is triggered by the trigger signal on line 59 to sample the signal output from filter 64 and provides that signal on bus 56 to the A/D converter input of microprocessor 40. During motor running conditions, the signals provided by the sample and hold to microprocessor 40 can be compared to one another to determine peak current magnitudes that are representative, for a given voltage input, of minimum inductances of the energized stator coil.

The signals provided by the sample and hold then are used in the microprocessor 40 as a calibration when determining the output on bus 42 to D/A converter 44 and comparator 66. This is explained in detail further below.

MOTOR START UP

During start up, it is often desired to provide a DC pulse to the appropriate stator phase to initiate movement of the rotor. To determine which phase to initiate, a brief pulse is provided to each of the stator phases, one at a time, and the resultant current as measured at the output of low pass filter 64 is read by the microprocessor 40 A/D input from the sample and hold 60. This process provides the microprocessor 40 with a current measurement for each stator phase. Since the voltage applied to the motor is a known fixed value, it is assumed that the measured currents are indicative of inductance of each stator phase.

Figure 4:
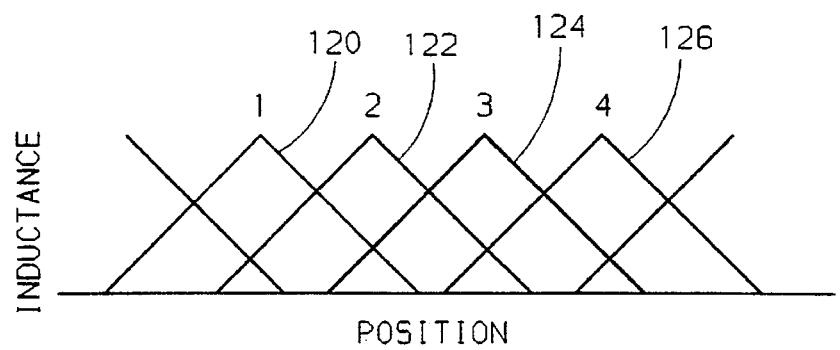
FIG. 4 illustrates a synchronous reluctance motor start-up reluctance map for use with this invention.

FIG. 4 illustrates a start-up reluctance map that is used to determine which stator phase to first energize to begin rotation of the motor. The energized phase is determined by the desired direction of rotation and the order of magnitudes of the measured reluctances as indicated by the sampled current signals. To rotate the motor in the direction of phases 1->2->3->4, phase 1 is activated if its measured reluctance is greater than that of the remaining phases and phase 4's measured reluctance is greater than phases 2 and 3 or if phase 4's measured reluctance is the greatest and phase 1's measured reluctance is greater than phases 2 and 3. This method is applied similarly to phases 2, 3 and 4.

This start-up logic can be implemented as follows: (a) determine the phase with the maximum measured reluctance; (b) determine if the previous phase relative to the direction of rotation has the second greatest measured reluctance; (c) if step (b) is true, energize the phase with the maximum measured reluctance; (d) if step (b) is not true, energize the phase following the phase with the maximum measured reluctance, relative to the desired direction of rotation. For example, if phase 2 has the maximum measured reluctance, determine if phase 1 has the second greatest measured reluctance. If so, energize phase 2. If not, energize phase 3. If rotation is desired in the opposite direction 1->4->3->2->1, again assume phase 2 has the maximum measured reluctance. If phase 3 has the second highest measured reluctance, activate phase 2. If not, activate phase 1.

Figure 5:
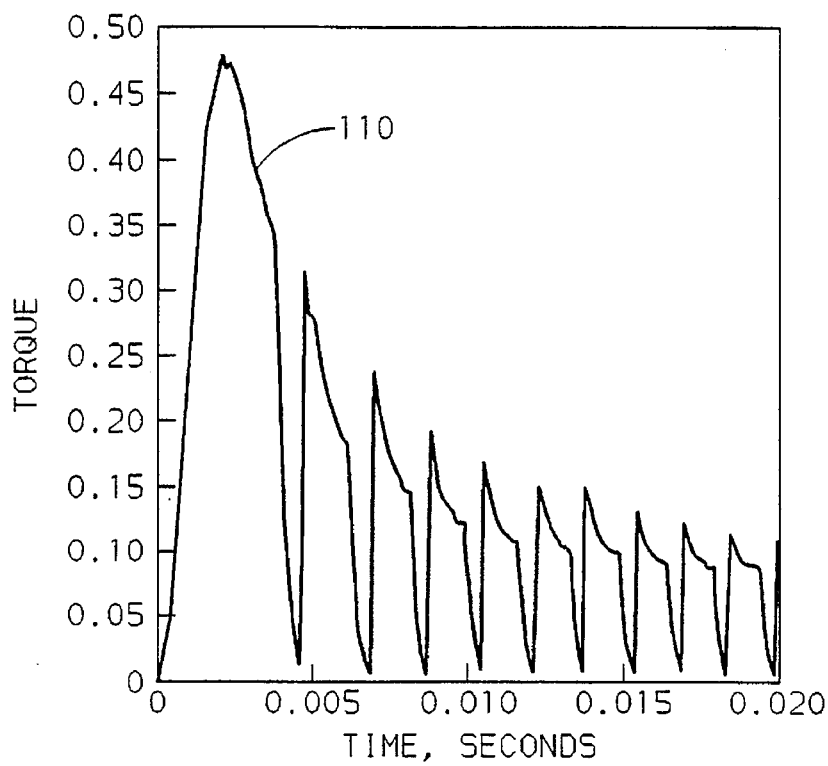
FIG. 5 illustrates an example torque response of a synchronous reluctance motor.

After the DC pulse is applied to the activated phase, the inductance of the activated phase is measured to determined $L_{MAX}$, the maximum phase inductance and the next phase of the stator windings is then energized. FIG. 5 illustrates a start-up torque map for an example 0-to-speed start-up of a synchronous reluctance motor and illustrates the change of torque from the initial start-up pulses to the torque corresponding to the running PWM pulses.

Figure 6:
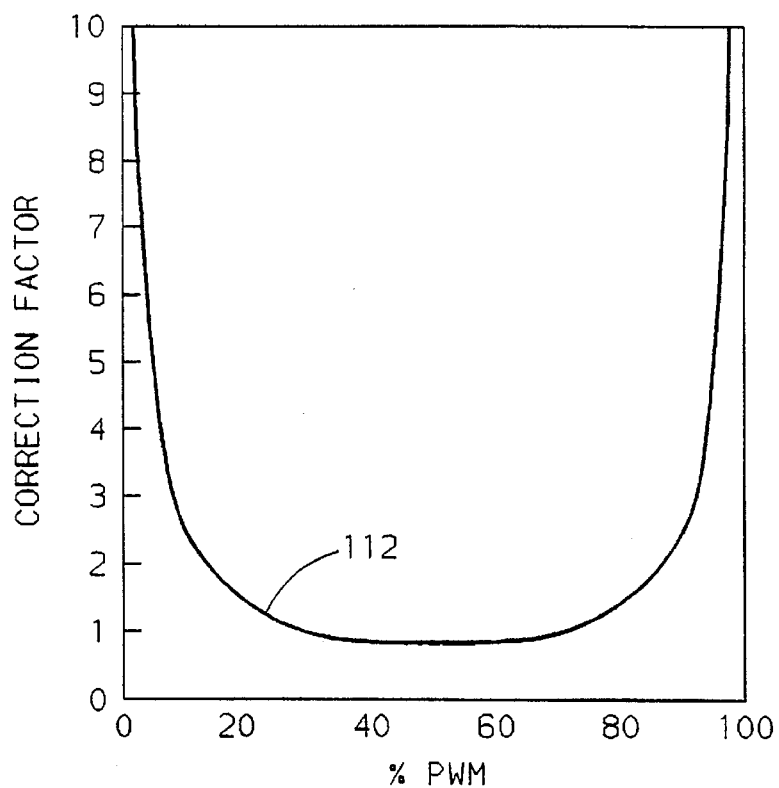
FIG. 6 illustrates a plot of error correction factors for use with an example implementation of this invention.

FIG. 6 illustrates why the start-up procedure is necessary. The trace 112 shown illustrates that position error measured through the comparator and trigger circuit in FIG. 3 predictably increases as the PWM signal driving the phases approaches 0% duty cycle and approaches 100% duty cycle, 100% being a DC signal. Thus, it can be seen that when a DC or near DC signal is applied during start-up, the large error prevents it from being used also to measure inductance of the coil or position of the rotor. Thus the sampling of each coil is provided according to this invention.

EXAMPLE 1

Figure 7:
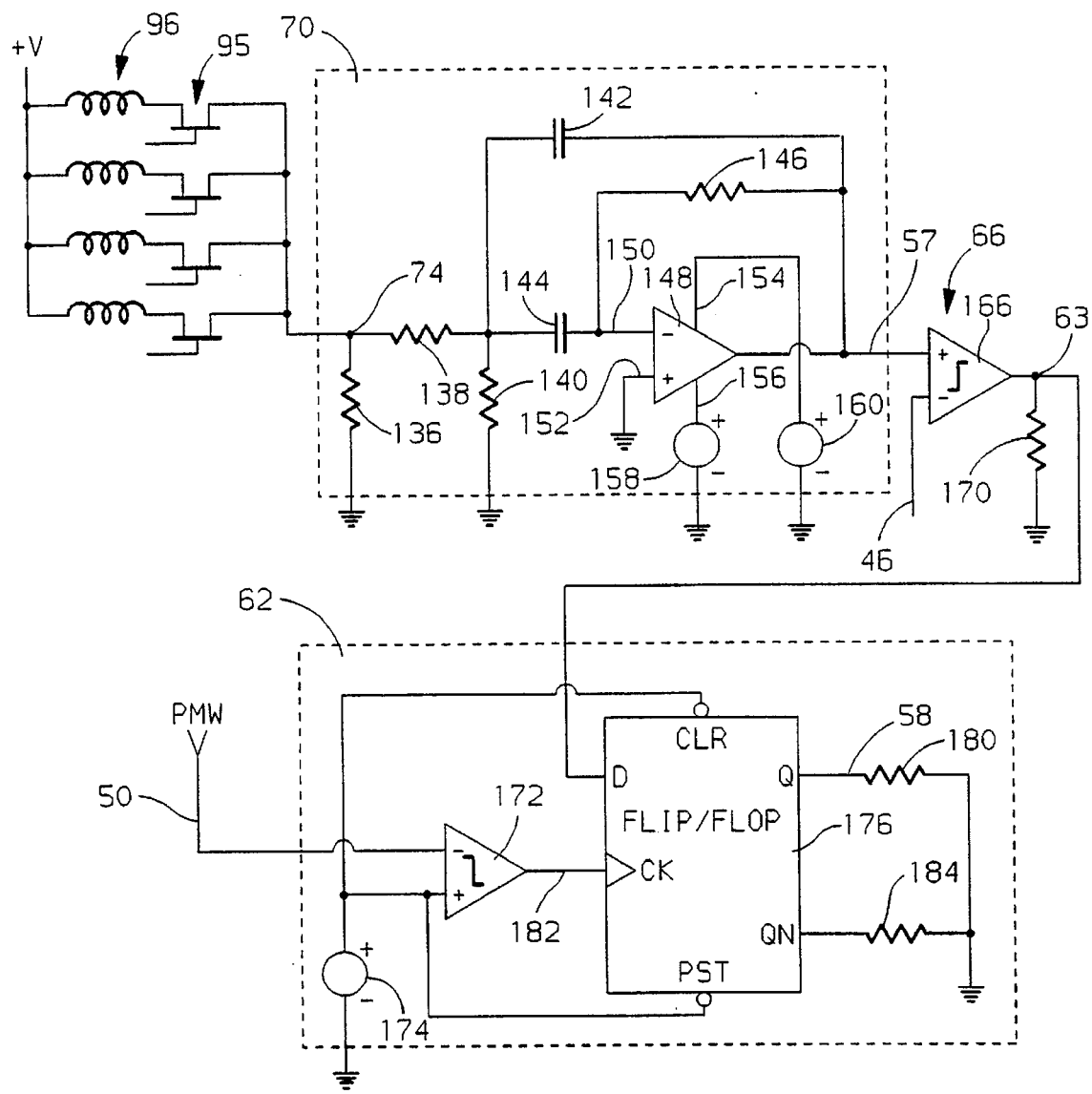
FIG. 7 illustrates an example circuit diagram for synchronous reluctance motor control according to this invention.

Referring now to FIG. 7, an example circuit implementation of the band pass filter 70, comparator 66 and trigger circuits 52 is shown. Reference 96 represents the motor stator coils, which are individually energized responsive to the PWM gate signals applied to gating transistors 95 in a known manner. The motor current through the energized coil 96 travels to node 74 and through current sense resistor 136 to ground. As a result, the voltage at node 74 is proportional to the sum of the currents through the energized motor coil 96 and, when only one phase 96 is energized at a time, is a measure of the current through the energized phase.

The band pass filter 70 includes operational amplifier 148 having its positive and negative voltage reference lines 154 and 156 connected to positive and negative 12 volt references 160 and 158 respectively. The circuitry including resistors 136, 138, 140 and 146 and the capacitors 142 and 144, connected as shown, providing a standard two pole band pass filter, the resistor and capacitor values of which are easily determined by one skilled in the art to center the filter around the frequency of the PWM signals supplied to the synchronous reluctance motor coils. The output of the band pass filter 70 on line 57 is provided to the non-inverting input of the comparison circuit 66 including comparator 166.

The inverting input of comparator 166 is connected to line 46, which sets the switching threshold for the motor. The output of the comparator on line 63 is biased normally low by the resistor 170 and is maintained high by the signals at the inverting and non-inverting inputs until the current signal on line 57 falls below the signal on line 46. The signal on line 63 corresponds to the signal 34 in FIG. 2C.

Line 63 is provided to the trigger circuit 62 containing flip-flop 176. More particularly, the flip-flop 176 is a D-type flip-flop and line 63 is connected to the D input. The Q and QN outputs of flip-flop 176 are biased normally low by resistors 180 and 184 (shown). The clear and preset inputs to flip-flop 176 are biased by 1 volt reference 174 as shown. The PWM pulse signal from microprocessor 40 on bus 50 is provided to the inverting input of comparator 172, which provides on line 182 an inverted pulse signal to the clock input of flip-flop 176.

When lines 182 and 63, the clock and the D inputs to the flip-flop 176, are both high, the Q output of flip-flop 176, line 58, remains high. When the signal on line 182 is high at the same time as the occurrence of a low pulse, such as pulse 37 (FIG. 2C), on line 63, the Q output of flip-flop 176 on line 58 goes low, providing the trigger signal to the microprocessor 40, as described above.

As can be seen, the circuit implementation of the summation, band pass, comparator and trigger circuits is advantageously efficient and the single circuit implementation shown operates for rotor position detection regardless of which phase of the stator is energized.

EXAMPLE 2

Figure 8:
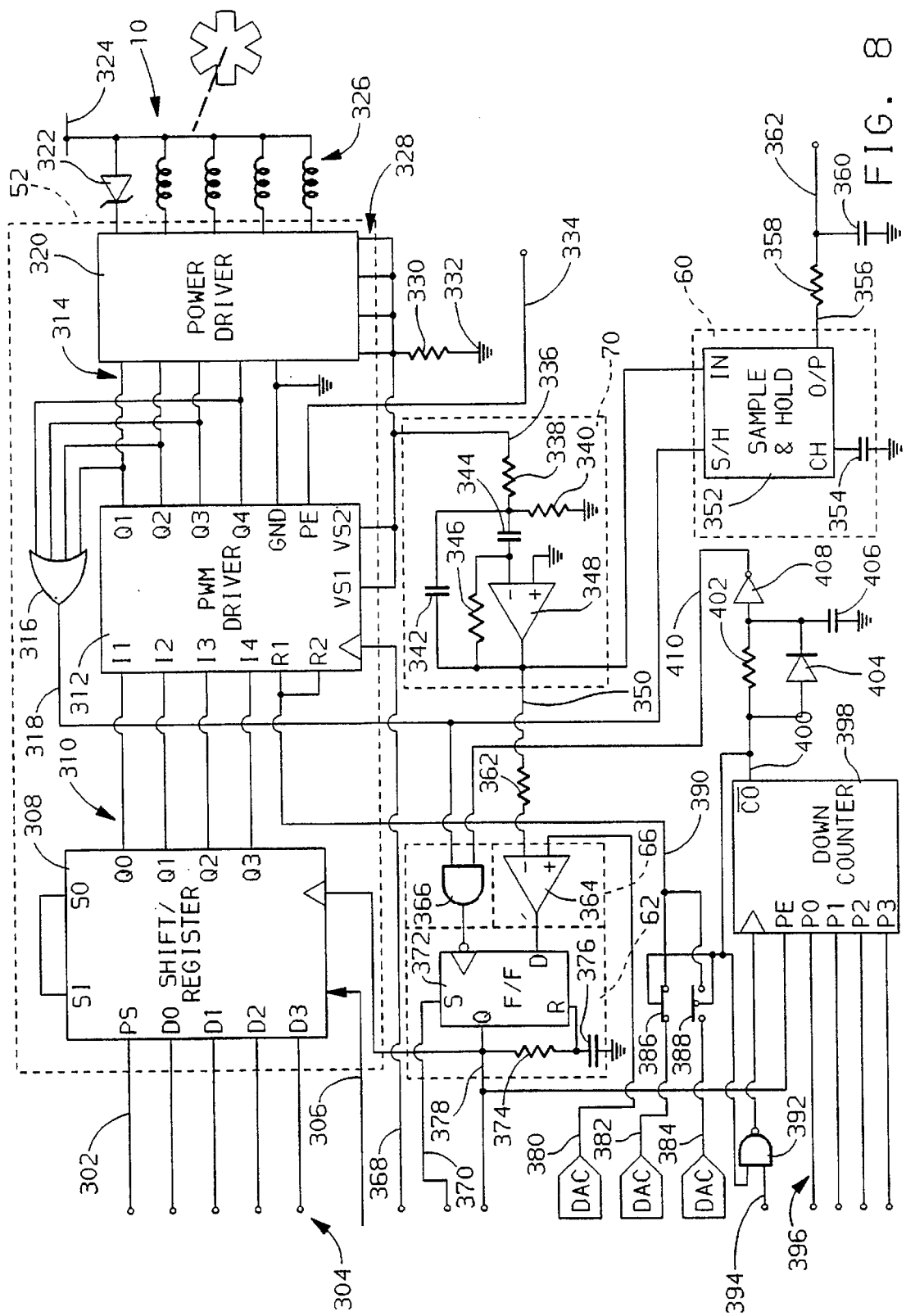
FIG. 8 illustrates an example circuit diagram for synchronous reluctance motor control according to this invention.

Referring now to FIG. 8, the example circuit implementation of this invention shown includes motor 10 having four stator coils 326 and logic and drive circuitry for the motor including shift register 308, PWM driver circuit 312 and power driver circuit 320. The band pass filter 70 includes amplifier 348 and the comparison circuit 66 and trigger circuit 62 include amplifier 364 and flip-flop 372, respectively. The sample and hold circuit 60 includes analog sample and hold 352. A down counter 398 is provided to act as a timer to control first (torque) and second (measurement) energization of each phase coil according to this invention.

Shift register 308 (a standard 14035 integrated circuit) has input lines 302, 304 and 306 controlled by a microprocessor (not shown). The lines 304 receive four binary signals from the microprocessor, for example, 10 0 0 provided to the $D_0$-$D_3$ inputs of shift register 308. The binary signals on line 304 are loaded to the shift register from the $D_0$-$D_3$ inputs to the $Q_0$-$Q_3$ outputs when a load signal is provided on line 302. The signal on line 306 controls the direction that shift register 308 shifts when line 378 clocks the shift register clock input. The output lines 310 of shift register 308 are provided to the $I_1$-$I_4$ inputs of PWM driver 312. The PWM driver 312 provides pulse-width modulated signals at the $Q_1$-$Q_4$ outputs as controlled by the signals at the $I_1$-$I_4$ inputs. An example PWM driver circuit 312 is an L-6506 PWM driver integrated circuit.

In single phase operation of the synchronous reluctance motor 10, each stator coil 326 is energized one at a time. To achieve this, only one of the inputs $I_1$-$I_4$ is high at any one time with the remaining inputs being held low. Thus, the output pattern of the shift register 310 during single phase operation of the motor 10 always has one logic 1 and three logic 0's.

The Q output of PWM driver 312 corresponding to the I input that is high provides a pulse-width modulated signal to the corresponding line 314. The frequency of the PWM signal is equal to the frequency of the PWM clock signal on line 368, which is provided by the microprocessor. The duty cycle of the PWM signal is proportional to the voltage input on line 390. Each of the lines 314 is input to the power driver integrated circuit 320 (for example, an L-7180 integrated circuit power driver) and controls a corresponding power driver output line connected to one of the stator coils 326 of motor 10.

An example power driver 320 comprises four Darlington switches controlling the four stator coils 326 so that the stator coils 326 are energized to the signal wave patterns on input lines 314. Because only one input line 314 is activated at a time during normal single phase motor operation, only one stator coil 326 is energized at time. The high sides of the motor stator coils are connected to the fixed voltage supply line 324 and zener diode 322 provides power from supply line 324 to the power driver 320. The lines 328 from power driver 320 are connected to sense resistor 330 and comprise the current path to ground from the stator coils 326 and the internal solid state switches of power driver 320. The current output, lines 328, also provide feedback to the PWM driver 312.

Because only one stator coil 326 is energized at a time, the sum of lines 328 is equal to the current through the energized coil. With the inclusion of sense resistor 330, a voltage signal is provided on line 336 that is proportional to the current through resistor 330 and, consequently, proportional to the current through the energized stator coil 326. Line 334 is a power enable line to the PWM driver integrated circuit 312 and is controlled by the microprocessor controller to enable the PWM driver circuit.

The signal on line 336 indicative of the level of current through the energized stator coil 326 is provided to the band pass filter 70 comprising operational amplifier 348, resistors 338, 340 and 346 and capacitors 342 and 344, connected as shown to provide a band pass filter operation of a known type. The output of the band pass filter 70, line 350, is coupled via resistor 362 to the comparator 66 comprising amplifier 364. The non-inverting input of amplifier 364 receives a signal on line 380 representative of the trigger level determined by the microprocessor for advancing the phase of the motor. For example, the trigger level may be output from the microprocessor through a digital-to-analog converter to provide the signal on line 380. When the output of band pass filter 70 becomes greater than the trigger level on line 380, comparator 364 provides a high output to the D input of flip-flop 372 and the trigger circuit 62.

The clock input to flip-flop 372 is connected to the output of AND gate 366. One input of AND gate 366 is received from line 318, which is the output of OR gate 316, having its inputs connected to the $Q_1$-$Q_4$ outputs of PWM driver 312. This circuit provides a signal on line 318 that goes high with the high portion of each PWM pulse to a stator coil 326. The other input to AND gate 366 is received from line 410, which is coupled to the output of down timer 398. Down timer 398 controls the time period length of the first energization of each stator coil.

At the start of the energization of each phase coil, a value DELAY is provided on lines 396 from the microprocessor to the input of down counter 398. A signal provided on line 378 signaling the start of each energization enables the down counter 398 by resetting the output, which brings line 400 high and loads the binary number on lines 396 into the $P_0$-$P_3$ inputs of down counter 398. The microprocessor provides a clock signal on line 394 to down counter 398. The output of AND gate 392 clocks the down counter 398, which brings line 400 low when the timer counts down to zero. The low signal on line 400 disables the clock input to timer 398 vis-a-vie AND gate 392. The low signal on line 400 is also coupled, vis-a-vie resistor 402, diode 404 and capacitor 406, to inverter 408, which, responsively, brings line 410 high, bringing high the second input to AND gate 366.

The function of the down counter 398 in the circuit shown is as follows. At the beginning of each energization cycle of each stator coil 326, the coil is first energized with either a DC signal or a PWM signal that controls torque output of the motor. The duty cycle of the PWM signal is set by the voltage level on line 382, which is referred to as the demand current ($I_{demand}$) to the motor and is coupled through FET 386 to line 90 to the duty cycle input of PWM driver 312. FET 386 is controlled to be on when the down timer output 400 is high.

During the time period that the energized stator coil is first energized as controlled by the signal on line 382, the rotor is not yet near the position at which it will be desirable to advance the phase of the motor by de-energizing the activated stator coil and energizing the next energized stator coil. The input to down counter 398 is computed (as described further below with reference to FIGS. 9 and 10) so that output line 400 always goes low before the phase advance switch time of the stator coils. In other words, a predictable finite period of time passes after activation of a stator phase coil before the rotor advances to a position where it is necessary to measure the rotor position to determine the phase advance time of the stator coils. DELAY is calculated to be no greater than this finite period of time.

When the output line 400 goes low, FET 386 turns off and FET 388 turns on, coupling the signal on line 384 ($I_{LIM}$) to line 390, which controls the PWM duty cycle of PWM driver 312. Instead of optimizing motor output torque production, the signal on line 384 provides a signal suitable for probing and measuring inductance of the energized stator coil. This is the second energization of each coil 326.

The first and second energization method is advantageous because, as illustrated with reference to FIG. 6, duty cycles responsive to demand current that are below 20% or higher than 80% introduce increased error into the current sensing function of the circuit. Thus, for the first time period that each stator coil is first energized, it is energized responsive to the demand current and for the second time period that each stator coil is second energized, it is energized responsive to the probe or sense current. Because the current flowing through the stator coil during the first energization may not be the current desirable for inductance threshold detection, AND gate 366, vis-a-vie line 410, inhibits the clock input to flip-flop 372 during first energization of each stator coil. During second energization of the stator coil, AND gate 366 enables the clock input of flip-flop 372, thereby allowing the comparison result (comparator 66) during second energization to control the flip-flop 372.

When the output of comparator 364 goes high during the second energization of a stator coil 326 and when that corresponds with a PWM HIGH signal on line 318, the Q output (line 378) of flip-flop 372 goes high and provides a clock signal to the input of shift register 308, advancing the shift register in the direction indicated by the signal on line 306, controlling, vis-a-vie PWM driver 312 and power driver 320, advancement of the energization to the next phase of the stator coils 326. The signal on line 378 also provides the enabled signal to timer 398 to begin the two-step energization process for the next energized stator coil including loading and counting down of the delay time through timer 398. Resistor 374 and capacitor 376 provide an automatic reset function to flip-flop 372 so that flip-flop 372 has a monostable operation. Line 378 also provides a signal input to the microprocessor to indicate that a phase advance of the stator windings has taken place.

With each pulse on line 318, sample and hold circuit 60 samples the output of the band pass filter 370 and holds that output on line 356, which is coupled through resistor 358 and capacitor 360 to line 362, which is provided to an A/D input of the microprocessor as a measure of the inductance of the stator coils 326. The signal on line 362 allows the microprocessor to measure the minimum inductance of the coils, which may vary with operating conditions such as temperature and age of the coil, allowing a self-calibration of the control routine by the microprocessor as described below.

Figure 9:
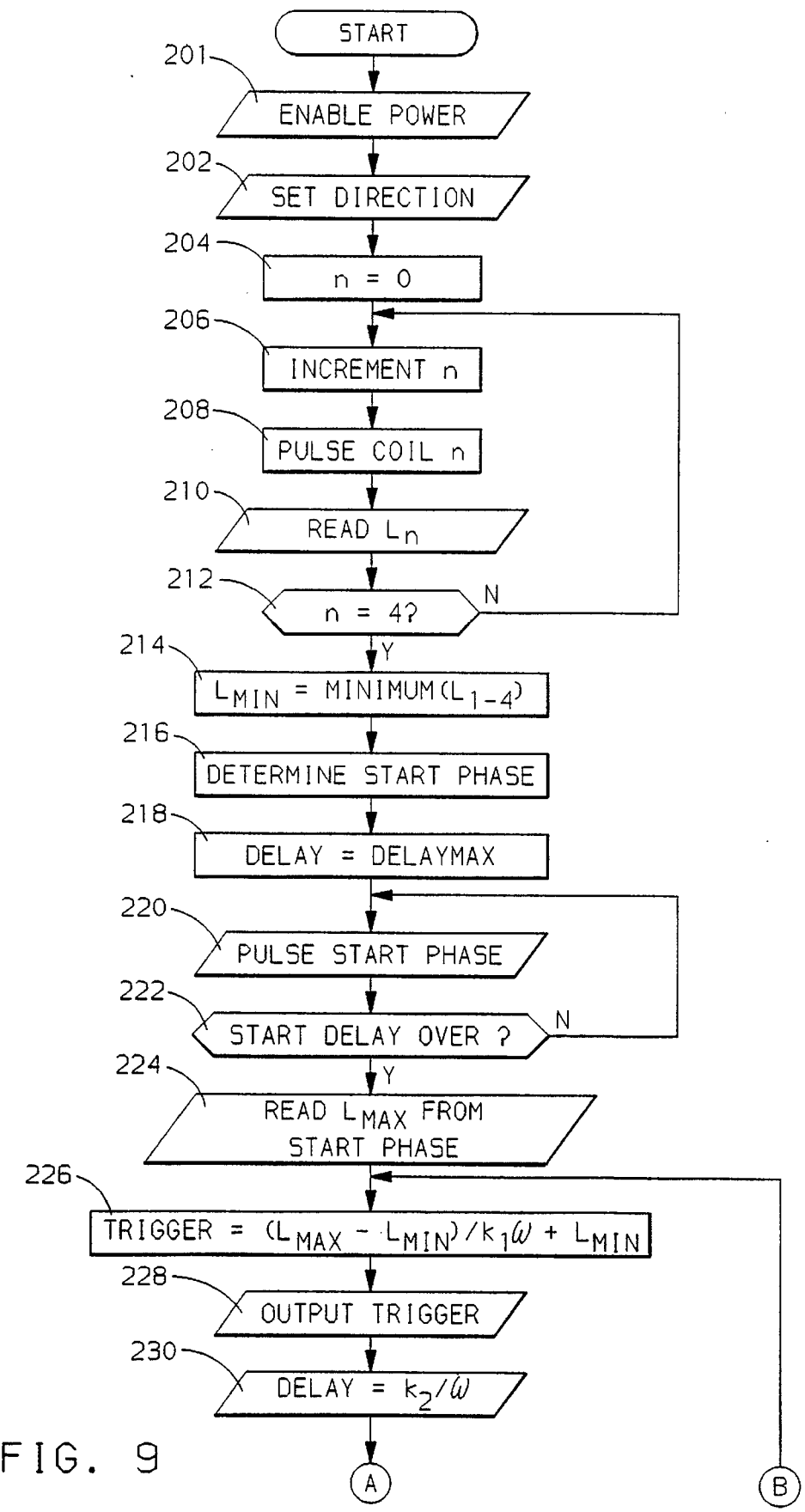
FIGS. 9 and 10 illustrates an example computer flow diagram for use with this invention as illustrated in FIG. 8.
Figure 10:
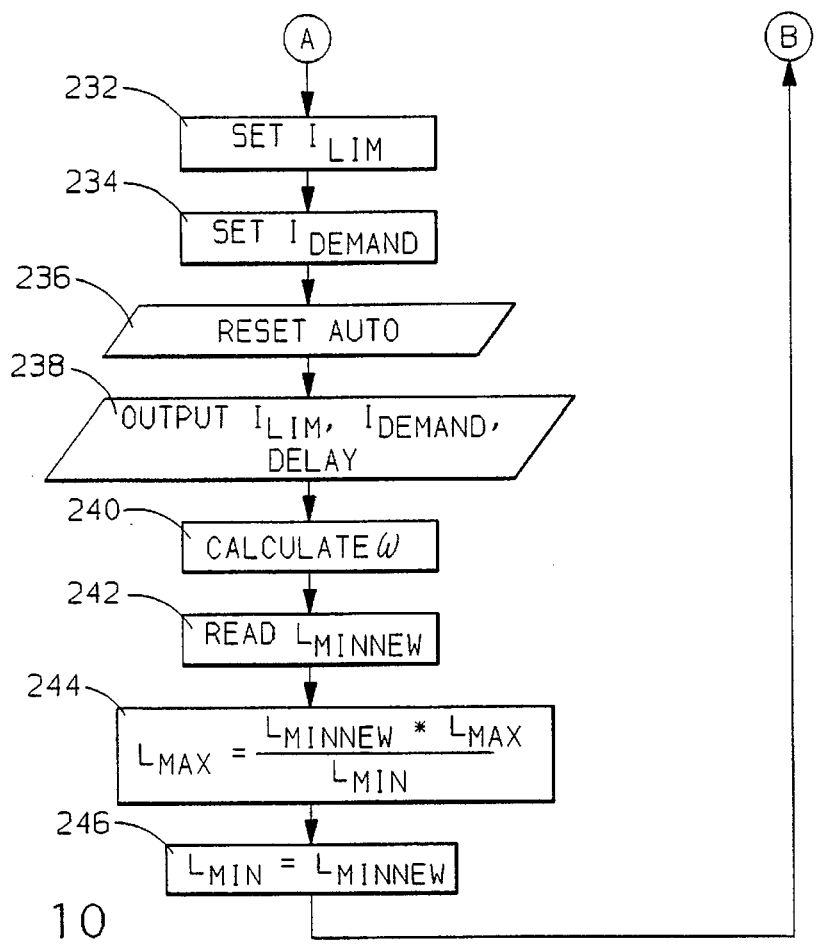

Referring now also to FIGS. 9 and 10, a flow diagram for implementing this invention using a microprocessor control program is shown. It will be recognized by those skilled in the art that the operations of the apparatus involving determining the desired PWM duty cycle from a commanded torque on bus 41 (FIG. 3) are well known to those skilled in the art and can be easily implemented in microprocessor 40 without further detail herein.

The flow routine for implementing this invention into the control starts and moves to block 201 where it sets the power enable line 334 and then moves to block 202 where it sets the direction line 306. Blocks 204-212 measure the inductance of the four phases of the stator windings. The inductance is measured as described above by pulsing each phase with a fixed duty cycle signal, for example a 50% duty cycle signal, and sampling the resultant current magnitudes. More particularly, block 204, sets a variable n=0, block 206 increments n and block 208 pulses the n phase coil of the stator windings. This is accomplished by loading shift register 308 with a command to activate phase n of the stator windings, setting the $I_{DEMAND}$ line 382 to a value corresponding to, for example, a 50% duty cycle command, and clocking line 368 with one or two pulses. Block 210 reads the measured inductance from line 362. Block 212 compares n to 4 to determine if all of the phase inductances have been measured. If n does not yet equal 4, the routine returns to block 206.

At block 214, the value $L_{MIN}$ is set equal to the lowest phase inductance. At block 216, the first phase of the motor to be energized is selected using the start-up reluctance map according to the logic described above with reference to FIG. 8.

At block 218, the variable DELAY is set equal to its maximum value and is output to line 396, the input of the down counter 398. At block 220, the first phase of the motor to be energized is pulsed with a start pulse by loading the proper pattern in to shift register 308, setting $I_{DEMAND}$ on line 382 to the desired start-up value (i.e., its maximum value), setting $I_{LIM}$ on line 384 to a value for inductance measurement (i.e., corresponding to a 50% duty cycle), setting line 370 low and clocking lines 368 and 394. After a period of START DELAY at block 220, block 222 reads the measured inductance $L_{MAX}$ from line 362. The delay values DELAY and START DELAY are set so that the first stator winding is energized long enough so that a rotor pole comes to rest in alignment with the energized stator phase coil. This allows the measured inductance to be the maximum inductance in the energized coil.

At block 218, the value trigger is determined responsive to $L_{MAX}$, $L_{MIN}$, $k_1$ and $\omega$ as follows:

$$\text{TRIGGER} = (L_{MAX} - L_{MIN})/(k_1 * \omega) + L_{MIN},$$

Block 228 outputs the value trigger to line 380. Block 230 determines the value DELAY=$k_2/\omega$, where $k_2$ is a constant fixed for a known motor load. The constant $k_2$ is easily predetermined by one skilled in the art by simple experimentation as a value that will provide a computed DELAY that is less than the time required for the motor to advance from the position at which a phase is first triggered to the position at which the next phase is to be triggered.

Block 232 sets the command $I_{LIM}$ as either a fixed value or a value dependent upon demanded torque to create a PWM command suitable for position sensing. Preferably, $I_{LIM}$ corresponds to a PWM duty cycle of no less than 10% and no greater than 90%. Block 234 sets the command $I_{DEMAND}$ responsive to a commanded motor torque determined in a known manner from either a manually input or computer determined torque command. In general $I_{DEMAND}$ is proportional to commanded motor torque. Block 236 brings line 236 low and block 238 outputs the commands $I_{LIM}$, $I_{DEMAND}$ and DELAY.

Block 240 determines the motor rotational velocity as inversely proportional to the time between successive pulses on line 378. Block 242 reads the energized stator coil's new minimum inductance $L_{MINNEW}$ from line 362 and block 244 updates $L_{MAX}$. As the operating conditions of the motor change, the measured minimum inductance of the phase coils changes. During running operation of the motor after start-up, there is no opportunity to measure the maximum coil inductances. To update $L_{MAX}$, it is assumed that the maximum coil inductance changes with motor operating conditions in relation to the minimum coil inductance, which is measured at block 242. Thus, $L_{MAX}$ is updated according to the equation:

$$L_{MAX}=(L_{MINNEW}* L_{MAX})/L_{MIN}.$$

Block 246 then updates the variable $L_{MIN}$. After block 246, the routine returns to block 226 and repeats the steps thereafter in an iterative manner.

Figure 11:
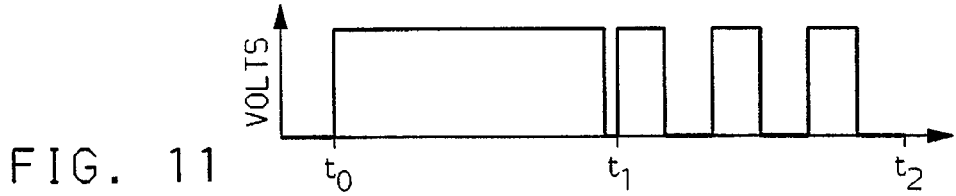
FIGS. 11, 12 and 13 illustrate example stator coil energization signals according to this invention.
Figure 12:
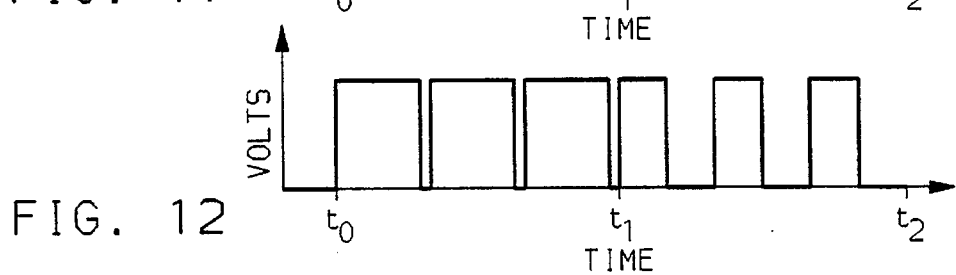

Referring to FIGS. 11 and 12, example stator coil energization wave forms provided by the circuit and control described above with reference to FIGS. 8–11 are illustrated. In FIG. 11, the time $t_0$ marks the activation of the energized stator coil. From time $t_0$ to $t_1$, the energized stator coil is driven with a DC pulse to provide maximum rotational torque on the motor. The time period between times $t_0$ and $t_1$ is determined by the value DELAY programmed into down counter 398 at the beginning of the coil energization. Because the DELAY time is always determined to be shorter than the total on time of the energized coil, the time $t_1$ always occurs before the rotor moves to the position at which it is desirable to advance the energization of the stator windings to the next phase. Beginning at time $t_1$, the energized coil is pulsed with the PWM command determined by $I_{LIM}$ to allow for measurement of the inductance of the energized coil and detection of the rotor position to determine when it is desirable to phase-advance energization of the stator coils. By time $t_2$, the measured inductance from the energized coil indicates that the rotor is in a position requiring phase advance of the stator coils so the energized coil is de-activated and the next stator coil is energized. In the stator coil energization method illustrated in FIG. 11, the time period between times $t_0$ and $t_1$ is referred to as the torque period of the energization cycle and, as described above, the length of the torque period is inversely proportional to motor speed. The time period between times $t_1$ and $t_2$ are referred to as the measurement period of the energization cycle, and is generally a limited number of pulses long. Ideally, the measurement period is three PWM pulses long or less. However, some implementations may require longer measurement periods because of inherent system limitations to the accuracy of the computed value DELAY.

FIG. 12 illustrates a stator coil energization similar to FIG. 11 with a torque period (between times $t_0$ and $t_1$) characterized by a high PWM duty cycle signal.

Figure 13:
Figure 14A:
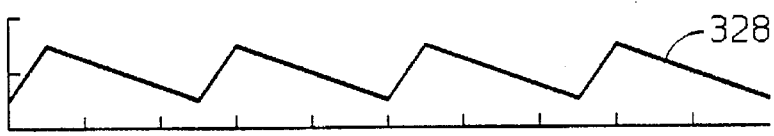
FIGS. 14A, 14B, 14C, 14D, 15A, 15B, 15C and 15D illustrate example signals for the circuit of FIG. 8.
Figure 14B:
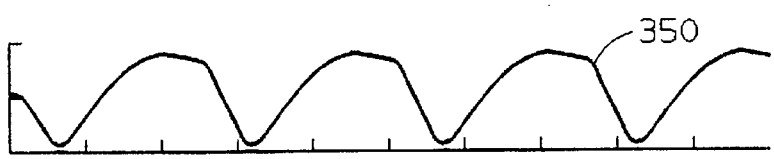
Figure 14C:
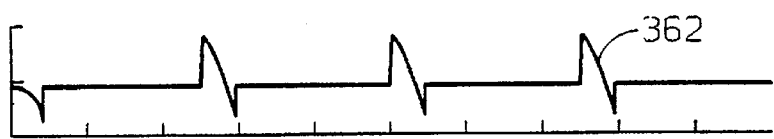
Figure 14D:
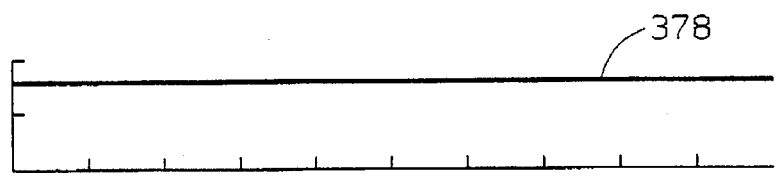
Figure 15A:
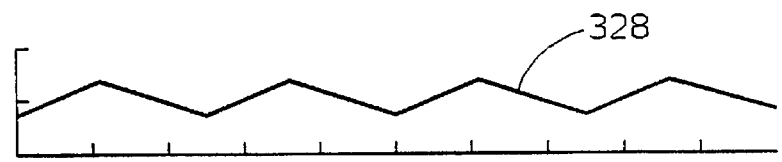
Figure 15B:
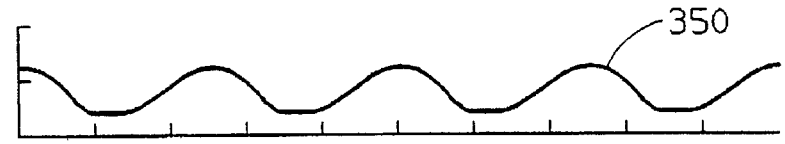
Figure 15C:
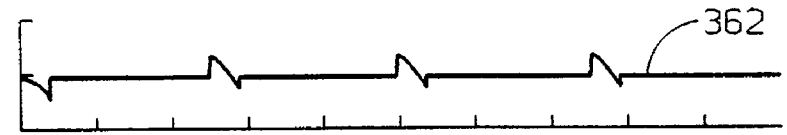
Figure 15D:
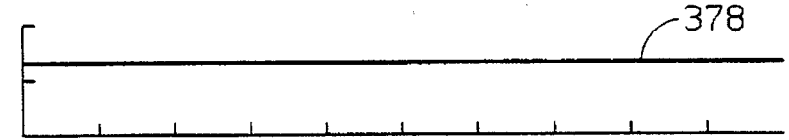

FIG. 13 illustrates a stator coil energization similar to FIG. 11 with a torque period (between times $t_0$ and $t_1$) characterized by a low PWM duty cycle signal.

FIGS. 14A, 14B, 14C, 14D and 15A, 15B, 15C, 15D illustrate wave forms of the circuit in FIG. 8 that occur when the motor rotor is frozen at two discrete rotor positions. FIGS. 14A–D illustrate example signals on lines 328, 350, 362 and 378, respectively, when the motor rotor is oriented so that a soft magnetic pole is aligned with the energized phase winding of the motor stator. This is the maximum inductance position for the motor with respect to the energized stator phase winding.

FIGS. 15A–D illustrate example signals on lines 328, 350, 362 and 378, respectively, when the motor rotor is oriented 22 degrees from the maximum inductance position. This is the minimum inductance position for the motor (having four stator phases and six rotor soft magnetic poles).

As FIGS. 14A–D and 15A–D illustrate, the current through line 328 and the filtered current thereof at line 350, vary from the maximum inductance position to the minimum inductance position of the rotor with respect to the energized phase winding. Likewise, the sampled current (peaks in line 362) vary with the magnitude of the current on line 350.

I claim:

1. A synchronous reluctance motor control apparatus, comprising:

a sensor for sensing inductance through an energized coil of a stator;

a filter receiving a signal from the sensor and providing a filtered signal responsive thereto;

a comparator circuit receiving the filtered signal and a threshold signal and providing a comparison output responsive to a comparison between the filtered signal and the threshold signal;

a microprocessor controller comprising (i) means for monitoring the sensed inductance to determine a minimum inductance of the energized coil, wherein the minimum inductance reflects manufacturing tolerances in the energized coil and dynamic inductance changes due to operating temperature and aging of the stator, and (ii) trigger set means for dynamically determining the threshold responsive to the determined minimum inductance of the energized coil; and a trigger circuit, receiving the comparison signal and outputting a trigger signal responsive thereto, wherein the trigger signal triggers energization of a next phase coil of the stator, wherein the motor control apparatus compensates for the manufacturing tolerances and the dynamic inductance changes of the stator.

2. The synchronous reluctance motor control apparatus of claim 1, wherein the sensor is a current sensor.

3. The apparatus of claim 1, wherein the trigger set means determines the threshold according to:

$$\text{threshold}=(L_{MAX}-L_{MIN})/(k_1*w+L_{MIN}),$$

wherein $L_{MAX}$ and $L_{MIN}$ are the maximum and minimum inductances, $k_1$ is a predetermined constant and w is indicative of rotational velocity of the motor.

4. A synchronous reluctance motor control, comprising the steps of:

selectively energizing one stator winding of a set of stator windings of a synchronous reluctance motor with a fixed voltage pulsed signal;

sensing inductance through the one stator winding during the energization thereof;

comparing the sensed inductance to a threshold wherein a value of the sensed inductance greater than the threshold indicates that the energized winding should be de-energized and that a next phase of the stator windings should be energized;

in a microprocessor controller, i) monitoring the sensed inductance to determine a minimum inductance of the one stator winding, wherein the minimum inductance reflects manufacturing tolerances in the one stator winding and dynamic inductance changes due to operating temperature and aging of the one stator winding, and (ii) dynamically determining the threshold responsive to the determined minimum inductance of the one stator winding; and outputting the determined threshold to a circuit performing the comparing step, wherein the motor control compensates for the manufacturing tolerances and the dynamic inductance changes of the stator windings.

5. A synchronous reluctance motor control according to claim 1, wherein the step of sensing inductance through the one stator winding senses current through the one stator winding as a measure of inductance through the one stator winding.

6. A synchronous reluctance motor control according to claim 1, wherein:

the step of selectively energizing one stator winding comprises the sub-steps of (i) first energizing the one stator winding with a DC signal of a first period less than a second period between when the one stator winding is energized and when a next phase stator winding is to be energized; and (ii) second energizing the one stator winding with a fixed voltage pulsed signal after termination of the first period and before termination of the second period, wherein the sensed inductance used in the comparing step is sensed during the second energizing of the one stator winding.

7. A synchronous reluctance motor control according to claim 6, wherein the step of sensing inductance through the one stator winding senses current through the one stator winding as a measure of inductance through the one stator winding.

8. A synchronous reluctance motor control according to claim 1, wherein:

the step of selectively energizing the one winding comprises the sub-steps of (i) first energizing the one stator winding with a torque signal of a first period less than a second period between when the one stator winding is first energized and when a next phase stator winding is to be energized; and (ii) second energizing the one stator winding with a measurement signal after termination of the first period and before termination of the second period, wherein the measurement signal is a fixed voltage pulsed signal having a second duty cycle that is not equal to a first duty cycle of the torque signal and wherein the sensed inductance used in the comparing step is sensed during the second energizing of the one stator winding.

9. A synchronous reluctance motor control according to claim 8, wherein the torque signal has a plurality of pulses and the first duty cycle is in a first range of 0–100% and wherein the measurement signal has a plurality of pulses and the second duty cycle is in a second range of 20–80%.

* * * * *